United States Patent [19]
Hill et al.

[11] Patent Number: 5,614,086
[45] Date of Patent: Mar. 25, 1997

[54] METHOD AND APPARATUS FOR REMOVING CONTAMINANTS FROM A WATER SUPPLY

[76] Inventors: David D. Hill, 4 North St., Cos Cob, Conn. 06807; Timothy Kane, 1364 King St., Greenwich, Conn. 06831

[21] Appl. No.: 461,879

[22] Filed: Jun. 5, 1995

[51] Int. Cl.⁶ .................................................. B01D 19/00
[52] U.S. Cl. ................. 210/170; 210/220; 210/747; 210/123; 210/125; 210/128; 210/139; 95/245; 96/158; 96/159; 96/162
[58] Field of Search ...................... 210/170, 167, 210/220, 747, 139, 123, 125, 128; 96/158, 159, 162, 202, 215, 220; 95/245

[56] References Cited

U.S. PATENT DOCUMENTS

| | | |
|---|---|---|
| 2,718,275 | 9/1955 | Banks . |
| 3,193,989 | 7/1965 | Sebete . |
| 4,371,383 | 2/1983 | Root . |
| 4,544,488 | 10/1985 | O'Brian . |
| 4,696,739 | 9/1987 | Pedneault . |
| 5,080,793 | 1/1992 | Urings . |
| 5,171,334 | 12/1992 | Kabis . |

Primary Examiner—Thomas M. Lithgow
Attorney, Agent, or Firm—Alfred E. Miller

[57] ABSTRACT

A bubble aeration system and method for removing radon and other contaminants from domestic or commercial water supplies in a single tank having a baffle arrangement or channels creating a sinuous water path for a more effective separation of radon from the water supply and incorporating a storage chamber for cleaned water.

8 Claims, 3 Drawing Sheets

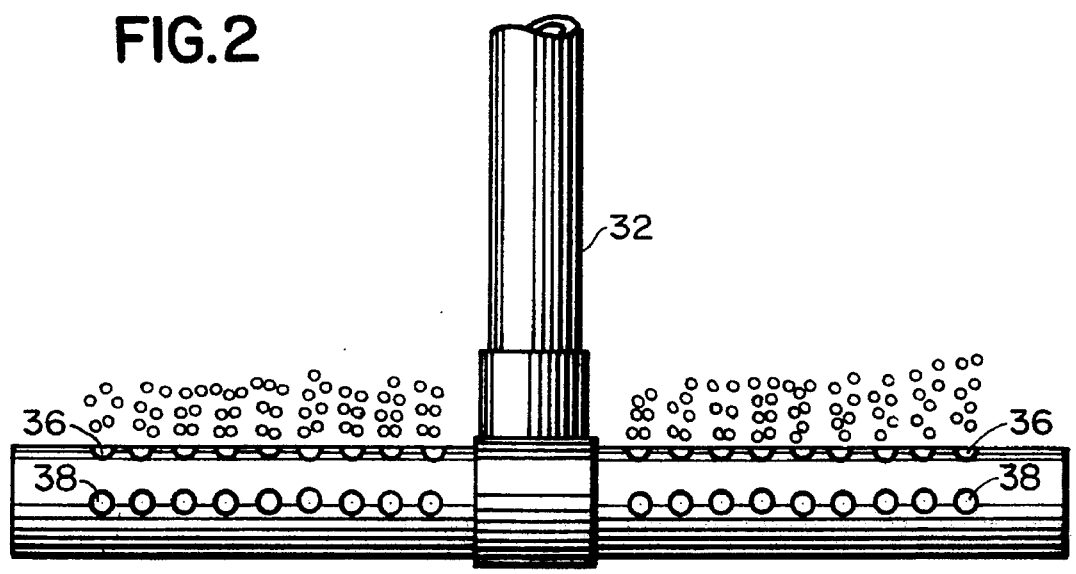
FIG.2
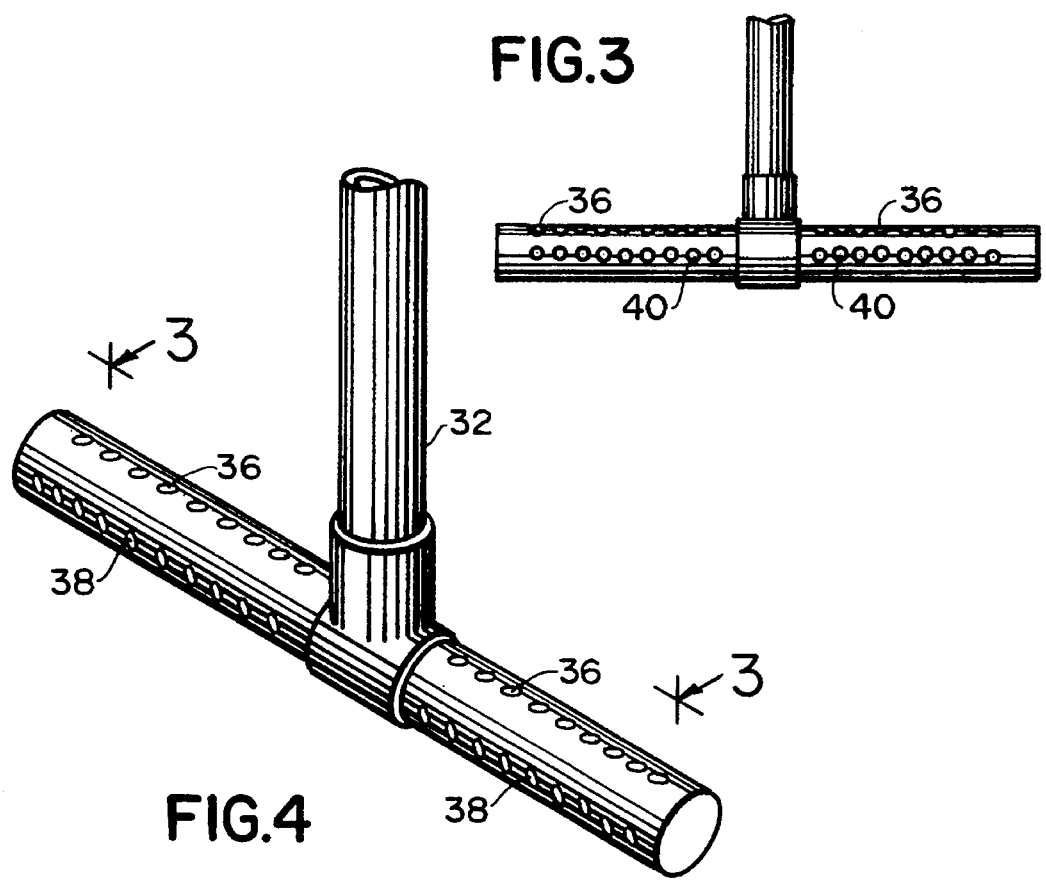
FIG.3
FIG.4

METHOD AND APPARATUS FOR REMOVING CONTAMINANTS FROM A WATER SUPPLY

The present invention relates to an apparatus or system for removing hazardous contaminants, such as radon and other volatile organic compounds (VOC's), from domestic and commercial water supplies.

Previous systems for removing radon, or the like, have been based on diffused bubble technology, such as shown and described in U.S. Pat. No. 4,663,089 to Lowry et al. However, it is believed that that system is prohibitively large for domestic use and requires a long residence time of the water in separate water holding tanks forming multiple stages for removal of radon. Consequently, a large demand and consumption of household water will result in degraded performance of the system and contaminated water to some degree will flow into the household.

This invention is directed to aeration equipment for removing radon and VOC's from well water which is generally used on levels of radon of over 15,000 pCi/l.

An aeration system is the process of agitating and percolating the incoming water supply with pressurized air causing separation of the radon gas which is then vented to the atmosphere. The treated water is then pressurized and stored. The three main types of aeration systems are shallow tray aerator, spray aerator and diffused bubble aerator. The present invention is directed specifically to diffused bubble aerators in which contaminated water is introduced into a tank having double baffles or channels forming separate treatment chambers. High pressure filtered air is blown through specifically constructed diffusers in each of the chambers. The process effectively separates the radon and many other VOC's from the water and the cleaned water is directed to a built-in storage tank for repressurizing and movement to a holding tank for domestic or commercial use.

SUMMARY OF THE INVENTION

It is therefore an object of the present invention to provide an apparatus for removing contaminants from a domestic or commercial water supply by providing a single tank with a series of spaced double baffles creating a pipe or a channel a cascade water flow path in which water enters the bottom of the first chamber and is aerated and rises up in the respective chamber and spills over one of the baffles to flow in the channel formed by the spaced baffles to the bottom of the following chamber. The double baffle arrangement ensures that the least treated water enters the bottom of each following chamber, and the up and down water flow results in a cascade rinse.

A further object of the present invention is to provide a diffuser for air under pressure which creates an even flow of air bubbles whose agitation functions to effectively release the radon and the VOC's in the chambers. The gases released during the aeration process are exhausted to the atmosphere through a vent pipe. The diffusers are also fabricated so as to resist fouling that may be induced by the presence of certain elements in the water supply, such as iron and manganese Another object of the present invention is to provide a built-in storage area in the tank whereby the processed water is held therein prior to being re-pressurized and sent to a holding tank for home or commercial use.

It is a further feature of the present invention to provide a solenoid valve which when operative permits the flow of untreated water into the aeration tank, and a second back-up solenoid to be utilized in the event that the main solenoid valve switch becomes non-operative.

Another feature of the present invention is the provision of an on-off float switch in the storage area of the present invention aeration tank. When the water level decreases to a predetermined height the solenoid valve at the entry to the aeration tank becomes operative to thereby permit new untreated water to enter the system.

Another object of the present invention is to effect a greater reduction of radon in a water supply by directing the flow of water through a multi-chamber aeration process in a single tank in which air to water contact is maximized.

The above and other objects and features of the present invention will become apparent by reference to the following description of my invention and the drawings.

BRIEF DESCRIPTION OF THE DRAWINGS

FIG. 2 is an enlarged partial side elevation view of the air diffuser for the aeration chamber of the system taken along the lines 2—2 of FIG. 1.

FIG. 3 is a perspective view of the air diffuser shown in FIG. 2.

FIG. 4 is an end elevational view of the air diffuser showing the three rows of holes therein.

DESCRIPTION OF THE PREFERRED EMBODIMENT

Figure 1:
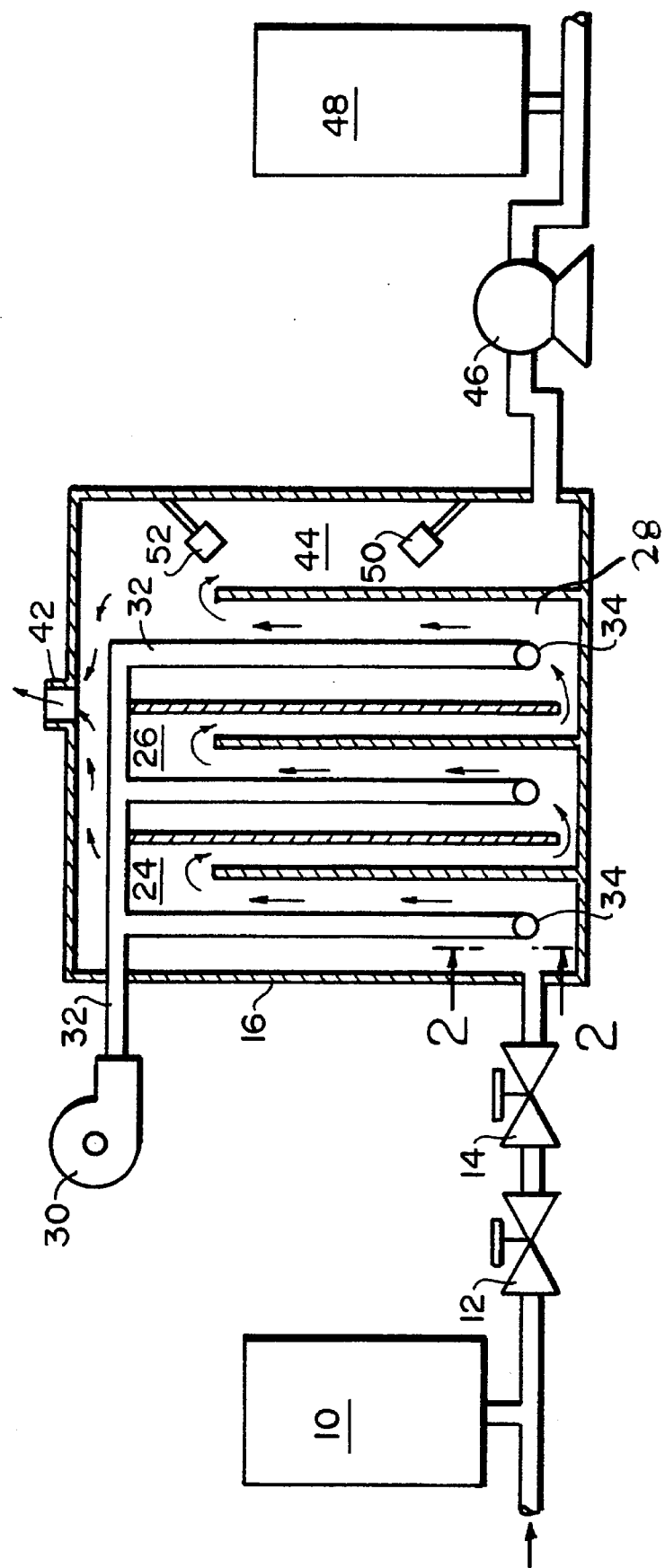
FIG. 1 is a diagrammatic view of the diffused bubble aeration system for removing contaminants from domestic water or commercial supplies constructed and arranged in accordance with the teachings of the present invention.

Referring to FIGS. 1–3, a diffused bubble aeration system and apparatus is shown in which untreated contaminated water, for example coming from an underground well, is stored in a pressure tank 10, and when the solenoids 12 and 14 are in the open position the water is directed into the bottom of a single diffused bubble aeration tank 16 at 18.

The tank 16 is preferably fabricated of polypropylene and has spaced double baffles, pipe or channel 20 and 22 which divide the tank into separate chambers 24 and 26. Each of the double baffles 20 and 22 form a water flow path 28 therebetween. It will be observed that the baffle 22 is positioned higher in the tank 16 than the baffle 20 in order to prevent spill-over of the water being treated from chamber 24 to chamber 26, thus ensuring that the water being treated flows in a sine wave path as shown by the arrows. The present baffle arrangement also ensures that the least treated water enters the bottom of each of the following chambers.

A blower 30 creates high pressure air through piping 32 to bubble aeration diffuser bars 34 extending substantially perpendicular to the piping 32 at the bottom of each chamber 26 and 28. The aeration diffusers are shown in detail in FIGS. 2–4 having three rows of holes 36, 38 and 40 on the top and opposite sides of the bar, respectively. It has been determined that the most efficient size holes are 7/64 inch, which achieves better aeration by creating more bubbles. Each of the diffuser bars 34 run substantially the entire length of each chamber, thus creating an even flow of air bubbles rising up from the bottom of each chamber.

Air having contaminants, such as radon and VOC's, collected at the top of tank 16 and the air pressure from the blower 30 causes the contaminated air to exit through exhaust pipe 42. In some applications an auxiliary fan (not shown) can be connected to the vent line or exhaust pipe 42 to aid in the exhaust of contaminants in the tank. At the end of tank 16 remote from the entry into the tank of contaminated water at 18 is a storage chamber 44 for cleaned water awaiting repressurization by jet pump 46 and delivery to a holding tank 48 for cleaned water. In storage chamber 44 is a float switch 50 for operating the system, as well as a second float switch 52 at a higher level in the chamber. The latter switch functions as a fail-safe for the system.

Figure 5:
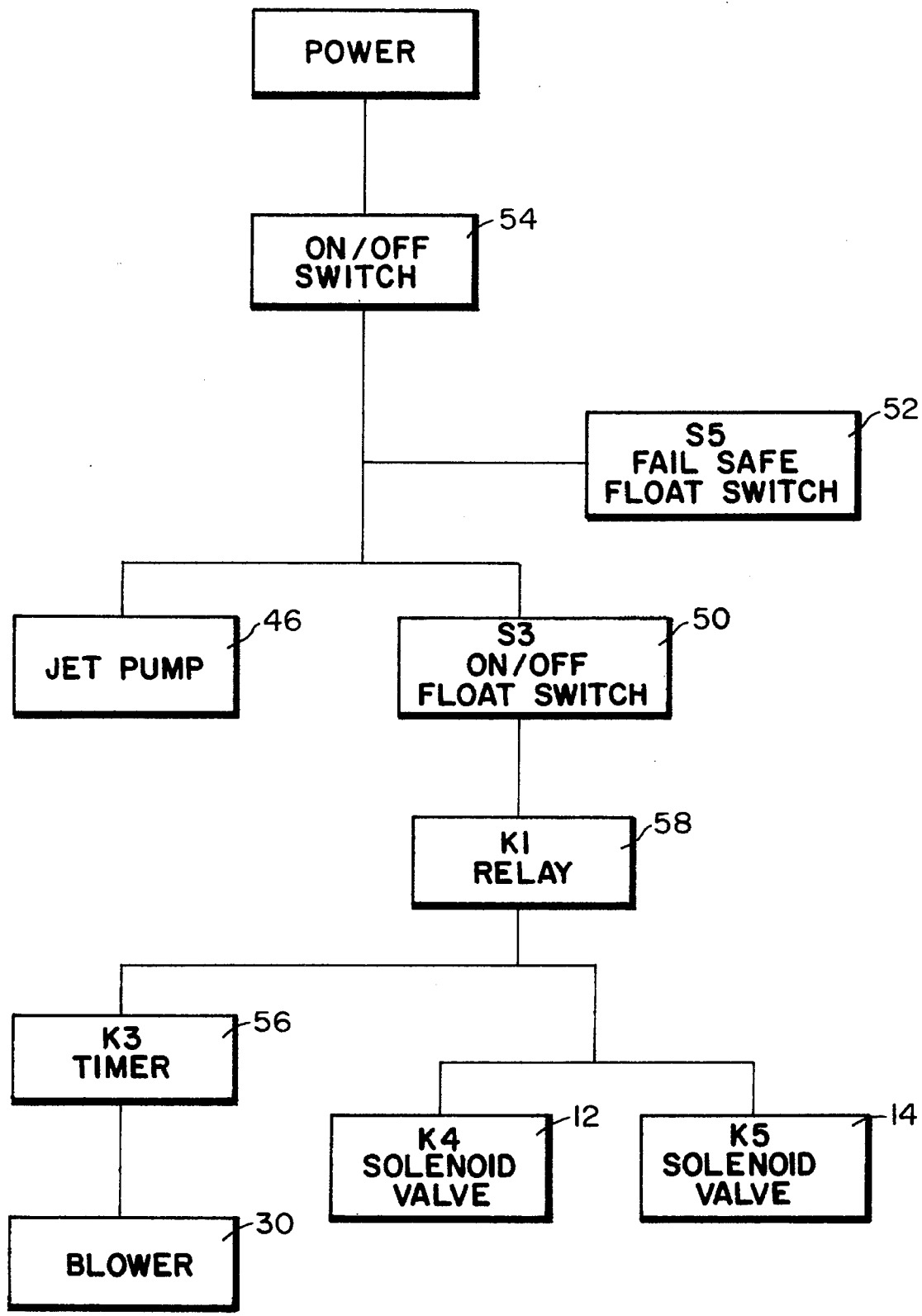
FIG. 5 is a flow diagram of the diffused bubble aeration system for domestic or commercial water supplies.

Referring now to the flow chart of FIG. 5 in which the system becomes operational through the on/off switch 54. The on/off float switch 50 in the storage chamber, when the water level drops to a predetermined level, will energize the system causing the solenoid valves 12 and 14 to open. The two solenoids are connected in series so that in the event the one becomes clogged and remains open the second one will close thus preventing water from entering the system. However, when the float switch becomes operational through relay 58, the solenoid valves open, and contaminated, untreated water from tank 10 enters the system. As this water enters the tank 16, the blower 30 having a timer 56 is also activated by the float switch 50 and blows air through piping 32 and diffuser bars 34 creating a maximum air to water ratio with considerable agitation. The timer 56 may be set for an adjustable time period so that the blower can be operated for an additional period of time after the solenoids shut off the water supply in order to maximize the amount of radon and VOC removal from the water supply and evacuated through the exhaust pipe 42, as shown by the arrows in the top of the tank 16.

Although the present invention has been disclosed and described with reference to a single embodiment thereof, it should be apparent that other variations and modifications may be made, and it is intended that the following claims cover said variations within the true spirit of the invention.

What I claim is:

1. A compact diffused bubble aeration system for a water supply from a well or the like containing contaminants comprising:

(a) a single tank for holding water and provided with a plurality of double baffle arrangements spaced in series in the interior of the tank, one of said spaced baffles being higher in the tank than the adjacent lower baffle, the higher of the spaced baffles being located downstream of the adjacent lower baffle to form water channel pathways therebetween, a series of separate succeeding aeration chambers, a storage chamber in said tank for cleaned water, a partition at the end of the series of aeration chambers to separate said aeration chambers from said storage chamber, (b) means for admitting untreated water from the well to the bottom of said tank through a tank inlet, said means for admitting untreated water further including at least one solenoid valve, air blower means for introducing high pressure air toward the bottom of each aeration chamber including diffusers located toward the bottom of each aeration chamber which create bubbles in the water through agitation and turbulence whereby the air and contaminants separate from the water, means to vent the air and contaminants from the tank, (c) at least one float switch in said storage chamber connected to at least one solenoid valve which includes means for closing the at least one solenoid valve when the level of water in said storage chamber rises to a predetermined height and for opening the at least one solenoid valve when the level of water in said storage chamber drops to a predetermined lower level and activates said system, and (d) the water to be treated by the system entering at the bottom of one end of the tank takes a sinuous path from one aeration chamber to the succeeding aeration chamber between each pair of double baffles forming said channels whereby the higher baffle of each pair of baffles prevents spill-over to the next succeeding chamber causing the water passing through each end of said channels to enter the bottom of the next succeeding chamber, and the cleaner water from the last of the series of aeration chambers enters the storage chamber at the other end of said tank.

2. The compact diffused bubble aeration system as claimed in claim 1 further providing a second solenoid valve in series with said one solenoid valve which becomes operative in the event that said one solenoid valve becomes inoperative.

3. The compact diffused bubble aerator system as claimed in claim 1 further comprising a pump for repressurizing the cleaner water in said storage chamber.

4. The compact diffused bubble aerator system as claimed in claim 1 wherein said diffuser is an inverted T-shaped pipe having a plurality of holes in the part of the pipe in the bottom of said tank which extends substantially parallel to the bottom of said tank.

5. The compact diffused bubble aerator system as claimed in claim 4 wherein said holes are in rows on the top and opposite sides of said part of the pipe.

6. The compact diffused bubble aerator system as claimed in claim 5 wherein each of said holes has a diameter of 7/16".

7. The compact diffused bubble aerator system as claimed in claim 1 further providing a second float switch located at a higher level in said storage chamber than said one float switch which functions as a fail-safe device in the event that said one float switch malfunctions.

8. The compact diffused bubble aerator system as claimed in claim 1 further providing a timer for said blower means for added blower operation resulting in the maximum removal of radon from the water supply.

\* \* \* \* \*